US011292647B2

(12) United States Patent
Chiu et al.

(10) Patent No.: US 11,292,647 B2
(45) Date of Patent: Apr. 5, 2022

(54) UV-RESISTANT ROOFING SHINGLES FILM, ROLL, AND PACKAGE

(71) Applicant: HOOD PACKAGING CORPORATION, Burlington (CA)

(72) Inventors: Manuel Chiu, Oakville (CA); Robert Wayne Towery, Troup, TX (US)

(73) Assignee: HOOD PACKAGING CORPORATION, Burlington (CA)

( * ) Notice: Subject to any disclaimer, the term of this patent is extended or adjusted under 35 U.S.C. 154(b) by 151 days.

(21) Appl. No.: 16/131,732

(22) Filed: Sep. 14, 2018

(65) Prior Publication Data
US 2019/0218008 A1 Jul. 18, 2019

Related U.S. Application Data

(60) Provisional application No. 62/617,743, filed on Jan. 16, 2018.

(51) Int. Cl.
*B65D 65/20* (2006.01)
*B65D 85/62* (2006.01)
*C08K 5/00* (2006.01)

(52) U.S. Cl.
CPC .............. *B65D 65/20* (2013.01); *B65D 85/62* (2013.01); *C08K 5/005* (2013.01); *B65D 2565/381* (2013.01); *B65D 2571/00679* (2013.01); *B65D 2571/00833* (2013.01)

(58) Field of Classification Search
CPC ......... B65D 65/20; B65D 85/62; C08K 5/005
See application file for complete search history.

(56) References Cited

U.S. PATENT DOCUMENTS

| | | | | |
|---|---|---|---|---|
| 5,239,802 | A * | 8/1993 | Robinson | ............ E04D 1/26 52/518 |
| 2013/0085215 | A1 * | 4/2013 | Shitara | ............ C09J 7/10 524/100 |
| 2017/0342045 | A1 * | 11/2017 | Mullen | ............ C08K 5/10 |
| 2019/0134965 | A1 * | 5/2019 | Waldie | ............ C08K 3/22 |
| 2019/0161656 | A1 * | 5/2019 | Pomorin | ............ C08F 283/124 |
| 2019/0322089 | A1 * | 10/2019 | Zhou | ............ B32B 27/302 |

FOREIGN PATENT DOCUMENTS

CA 2976254 A1 2/2019

\* cited by examiner

*Primary Examiner* — Tong Guo
(74) *Attorney, Agent, or Firm* — Norton Rose Fulbright Canada LLP

(57) ABSTRACT

An ultraviolet (UV)-resistant roofing shingles plastic film, package, packaging roll, and methods are disclosed. The UV-resistant plastic film includes an inner surface to face roofing shingles and an outer surface. The plastic film has a UV inhibitor to obstruct UV light.

12 Claims, 3 Drawing Sheets

UV-RESISTANT ROOFING SHINGLES FILM, ROLL, AND PACKAGE

CROSS-REFERENCE TO RELATED APPLICATIONS

This application claims priority to U.S. provisional patent application having Ser. No. 62/617,743 and filed Jan. 16, 2018, the entire contents of which are incorporated by reference herein.

TECHNICAL FIELD

The application relates generally to roofing shingles and, more particularly, to UV-resistant packaging for same.

BACKGROUND

Roofing shingles are often packaged in plastic shrink film. The film is placed around a bundle of roofing shingles, and is then passed through a convection heat tunnel where the plastic film is shrunk and tightly wrapped around the bundle of roofing shingles.

Each roofing shingle has an adhesive strip which is in contact with a release coating of the plastic film. The release coating allows the plastic film to be peeled off the roofing shingles without the plastic film becoming stuck to the adhesive strips.

When the wrapped bundle of roofing shingles is exposed to sunlight, the plastic film can deteriorate where it is in contact with the adhesive strips of the roofing shingles. The roofing shingles then become exposed to the elements and the integrity of the plastic film is compromised, which may result in the upper layer of roofing shingles being discarded.

SUMMARY

There is disclosed an ultraviolet (UV)-resistant roofing shingles package, comprising: roofing shingles arranged in a stack and each having an adhesive strip, the stack having an uppermost layer of roofing shingles; and a housing of the UV-resistant shingles package defined by a plastic film wrapped around and enclosing the stack, the plastic film having an inner surface facing the roofing shingles and an outer surface, the plastic film having a UV inhibitor to obstruct UV light, the UV inhibitor including a UV inhibitor strip portion extending along a length of the plastic film and aligned with the adhesive strips of the uppermost layer of roofing shingles, the UV inhibitor strip portion having a barrier layer overlapping the adhesive strips and including a black pigment to obstruct UV light, the UV inhibitor strip portion having a release layer in register with the barrier layer and disposed on the inner surface of the plastic film facing the adhesive strips.

There is also disclosed an ultraviolet (UV)-resistant roofing shingles plastic film, comprising: an inner surface to face roofing shingles and an outer surface, and a UV inhibitor to obstruct UV light, the UV inhibitor including a UV inhibitor strip portion extending along a length of the plastic film to be aligned with adhesive strips of the roofing shingles, the UV inhibitor strip portion having a barrier layer including a black pigment to obstruct UV light, the UV inhibitor strip portion having a release layer on the inner surface to face the adhesive strips of the roofing shingles.

There is also disclosed an ultraviolet (UV)-resistant roofing shingles packaging roll, comprising: a core, and a roofing shingles plastic film wound about the core, the roofing shingles plastic film having an inner surface to face roofing shingles and an outer surface, the plastic film having a UV inhibitor to obstruct UV light, the UV inhibitor including a UV inhibitor strip portion extending along a length of the plastic film to be aligned with adhesive strips of the roofing shingles, the UV inhibitor strip portion having a barrier layer including a black pigment to obstruct UV light, the UV inhibitor strip portion having a release layer on the inner surface to face the adhesive strips of the roofing shingles.

There is also disclosed an ultraviolet (UV)-resistant roofing shingles plastic film, comprising: an inner surface to face roofing shingles and an outer surface, a release strip on the inner surface positioned to face and be aligned with adhesive strips of the roofing shingles, and a UV inhibitor to obstruct UV light.

There is also disclosed an ultraviolet (UV)-resistant roofing shingles plastic film, comprising: an inner surface to face roofing shingles and an outer surface, a release strip on the inner surface positioned to face and be aligned with adhesive strips of the roofing shingles, and a UV inhibitor to obstruct UV light, at least the UV inhibitor including a UV inhibitor film blend forming part of the plastic film, the UV inhibitor film blend including a Hindered Amine Light Stabilizer (HALS) and a UV absorber, the HALS having a pKa value and being selected to reduce reactivity with the adhesive strips of the roofing shingles.

There is also disclosed a method of packaging roofing shingles, the method comprising: providing a plastic film with an ultraviolet (UV) inhibitor to obstruct UV light, the UV inhibitor including a UV inhibitor strip portion extending along a length of the plastic film and having a barrier layer including a black pigment, the UV inhibitor strip portion having a release layer on an inner surface of the plastic film; and wrapping the plastic film about the roofing shingles to align the UV inhibitor strip portion with an adhesive strip of an uppermost layer of the roofing shingles.

There is also disclosed a method of forming an ultraviolet (UV)-resistant roofing shingles packaging film, the method comprising: providing a plastic film with an inner surface to face the roofing shingles and an outer surface; providing a UV inhibitor to obstruct UV light, including providing a barrier layer with a black pigment along the inner surface of the plastic film to obstruct UV light; curing the barrier layer; and providing a release layer on the inner surface of the plastic film over the barrier layer.

DESCRIPTION OF THE DRAWINGS

Reference is now made to the accompanying figures in which.

DETAILED DESCRIPTION

Figure 1:
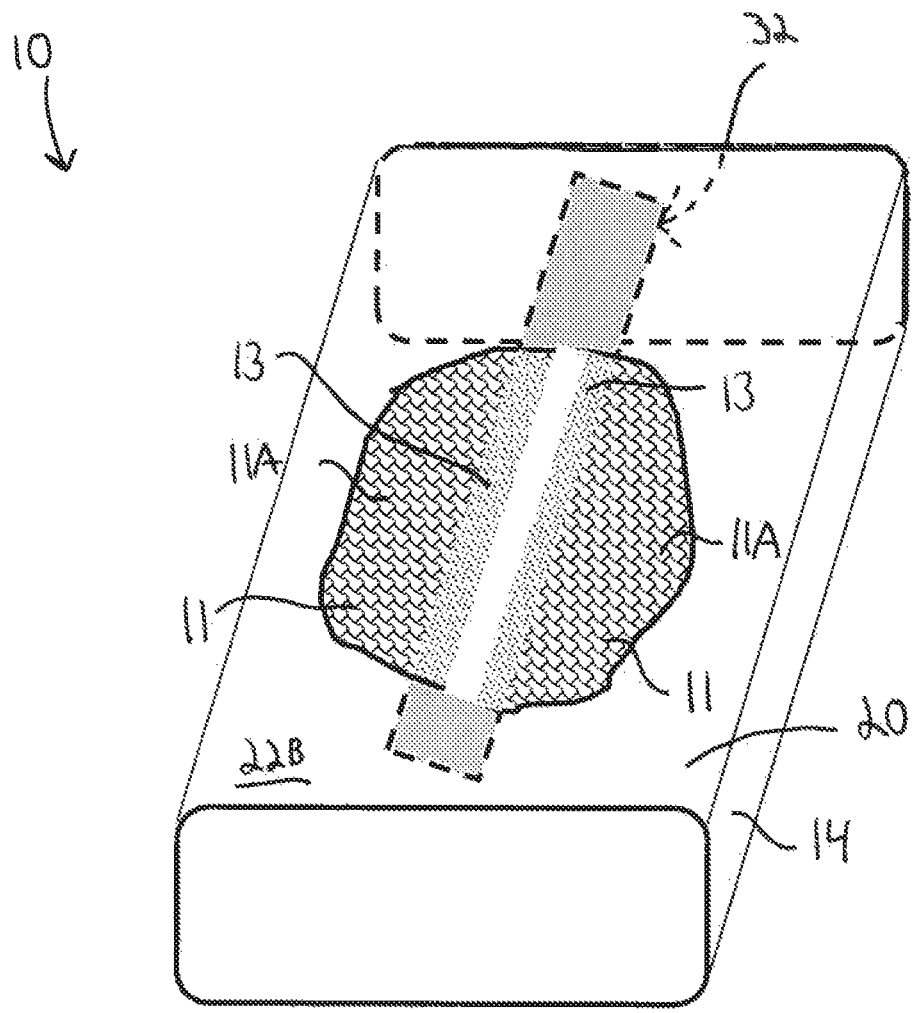
FIG. 1 is a perspective view of an ultraviolet (UV)-resistant roofing shingles package according to an embodiment of the present disclosure, a cut-out of the UV-resistant roofing shingles package showing an interior thereof with roofing shingles.

FIG. 1 illustrates an ultraviolet (UV)-resistant roofing shingles package 10. The UV-resistant roofing shingles package 10 encases and houses roofing shingles 11 to protect them from the elements, and to more easily transport them between locations. The UV-resistant roofing shingles package 10 (sometimes referred to herein simply as the "package 10") is resistant to UV light, and can thus be stored outdoors and exposed to direct sunlight and other sources of UV light. By "resistant", it is understood that the package 10 and/or some of its components is not easily broken down by UV light, and can thus be stored in a location (e.g. outdoors) and exposed to UV light for prolonged periods of time. The package 10 and/or some of its components therefore resists photo-oxidation.

Figure 3:
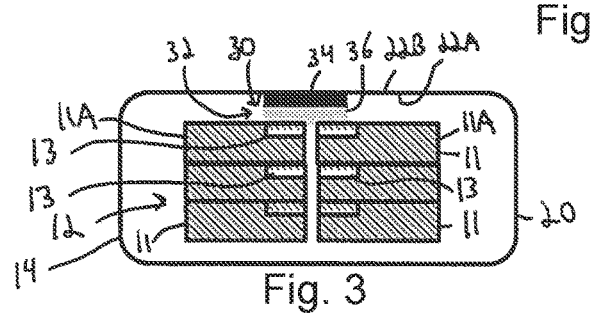
FIG. 3 is a cross-sectional view of the UV-resistant roofing shingles package of FIG. 1.

FIG. 1 shows a plurality of the roofing shingles 11. The roofing shingles 11 are arranged in a stack 12 (see FIG. 3) of roofing shingles 11. The stack 12 is formed by overlaying the roofing shingles 11 one on top of another. In FIG. 1, only an uppermost layer 11A of the roofing shingles 11 is shown for the sake of clarity, it being appreciated that the other roofing shingles 11 of the stack 12 are disposed underneath the uppermost layer 11A. In FIG. 3, for example, one possible configuration for a full vertical stack 12 of the roofing shingles 11 is shown. To facilitate the separation of the roofing shingles 11 in the stack 12, a release film or sheet may be provided on the bottom of each roofing shingle 11. Each roofing shingle 11 has an adhesive strip 13. The adhesive strip 13 of each roofing shingle 11 is used to adhere the roofing shingles 11 together when placed on a roof deck, such that the bottom surface of one roofing shingle 11 adheres to the adhesive strip 13 of an underlying roofing shingle 11. Although shown in FIG. 1 as being substantially box-like in shape, it will be appreciated that the package 10 can have other shapes as well.

The package 10 also has a housing 14 which encases and protects the stack 12 of roofing shingles 11. The housing 14 forms the corpus of the package 10. The housing 14 is defined by a plastic film 20 which is wrapped around and encloses the stack 12. In most configurations, but not necessarily all, the plastic film 20 is shrink wrapped around the stack 12. The plastic film 20 in the depicted embodiment is a polyethylene (PE) film, but other polymeric materials for the plastic film 20 are possible and within the scope of the present disclosure. Indeed, the plastic film 20 may be any thin, flexible sheet of polymeric material used to package roofing shingles 11.

Figure 2:
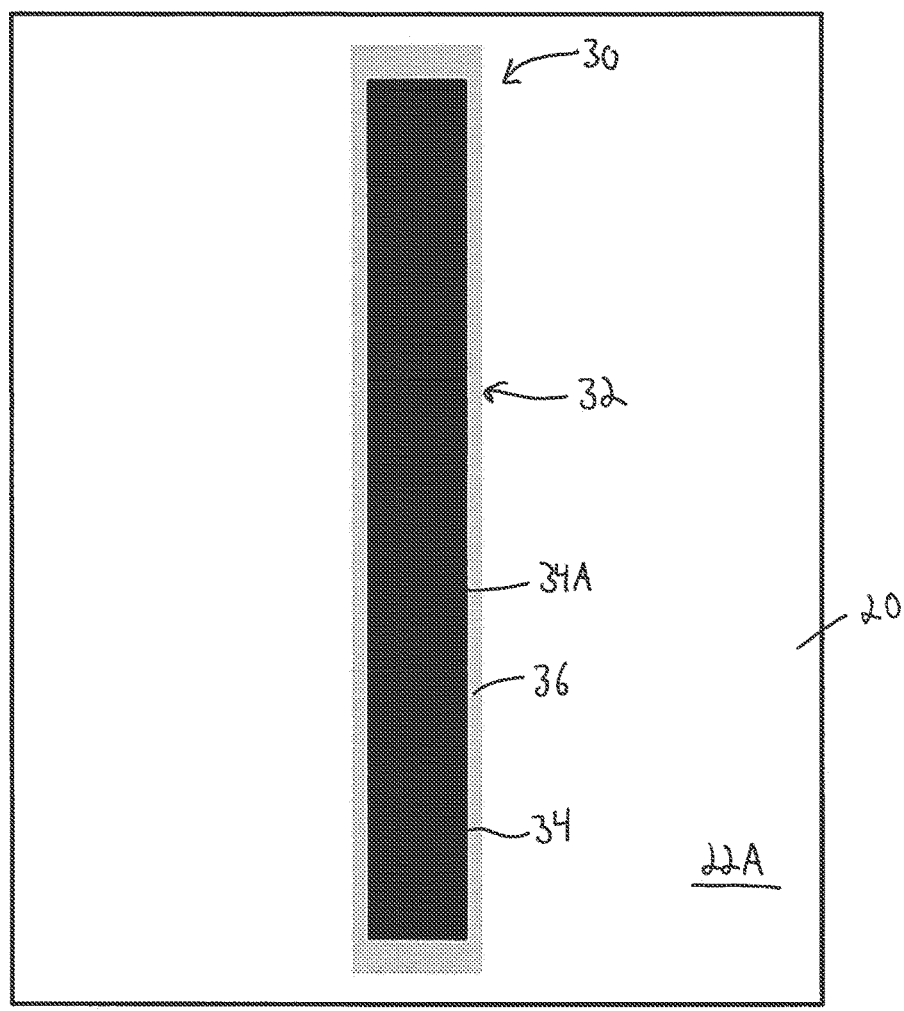
FIG. 2 is a plan view of a plastic film of the UV-resistant roofing shingles package of FIG. 1.

The plastic film 20 has an inner surface 22A (see FIGS. 2 and 3) facing the roofing shingles 11 and an outer surface 22B. The outer surface 22B faces away from the roofing shingles 11 and forms the exterior of the package 10. The outer surface 22B is directly exposed to the elements and to UV light. Referring to FIG. 2, the plastic film 20 forms a rectangular body when the plastic film is in a flattened state. The rectangular body of the plastic film 20 has pairs of parallel edges which intersect one another and which are interconnected to define the rectangular body. Specifically, and referring to FIG. 2, the rectangular body of the plastic film 20 has two pairs of parallel edges, and the parallel edges of one pair are perpendicular to the parallel edges of the other pair.

When some conventional packages for roofing shingles are stored outdoors and exposed to UV light from the sun over prolonged periods, it has been observed that the plastic film of the conventional package deteriorates along the length of the adhesive strips of the roofing shingles, at the location where the plastic film is in contact with the adhesive strips. It is believed that acidic compounds are released from the adhesive strips of the roofing shingles. These compounds react with the plastic film and remove or reduce the UV-resistance of the plastic film of the conventional package, thereby increasing the likelihood that photo-oxidation and/or UV light exposure will degrade the plastic film.

Referring to FIGS. 2 and 3, the plastic film 20 of the package 10 has a UV inhibitor 30. The UV inhibitor 30 is a coating, material layer, or substance that is present on the plastic film 20 which obstructs UV light. In so doing, the UV inhibitor helps to alleviate or eliminate the effects of UV light exposure on the plastic film 20. The UV inhibitor 30 can be present on the entire plastic film 20, or may be present on only a portion thereof. Different embodiments of the UV inhibitor 30 are described in greater detail below. The plastic film 20 in FIG. 2 is shown in a flattened state in which it is not wrapped around the shingles 11. In FIG. 3, the plastic film 20 is shown wrapped around the shingles 11 to define the housing 14 which encases and protects the stack 12 of roofing shingles 11.

In the embodiment of FIGS. 2 and 3, the UV inhibitor 30 includes a UV inhibitor strip portion 32 which extends along a length of the plastic film 20, and which is aligned with the adhesive strips 13 of the roofing shingles 11 when the plastic film 20 is wrapped around the stack 12 of roofing shingles 11. In the depicted embodiment, the UV inhibitor strip portion 32 extends along substantially all of the length of the plastic film 20. Referring to FIG. 2, the UV inhibitor strip portion 32 extends along the length of the plastic film 20 and is parallel to the edges of one of the pairs of edges of the rectangular body of the plastic film 20. The UV inhibitor strip portion 32 is positioned inwardly on the rectangular body of the plastic film 20. Referring to FIG. 2, the UV inhibitor strip portion 32 is disposed on the rectangular body of the plastic film 20 inwardly of the edges of one of the pairs of edges of the rectangular body. In an alternate embodiment, the UV inhibitor strip portion 32 extends along only part of the length of the plastic film 20. In another alternate embodiment, the UV inhibitor strip portion 32 is composed of discrete segments which are spaced apart from another along the length of the plastic film 20. Referring to FIG. 2, the UV inhibitor strip 32 has a rectangular shape, with a first pair of parallel edges that extend along the length of the plastic film 20 parallel to one of the pairs of edges of the rectangular body. The rectangular UV inhibitor strip 32 has a second pair of parallel edges that extend parallel to the edges of the other pair of edges of the rectangular body. Other configurations are also possible.

The UV inhibitor strip portion 32 has a barrier layer 34 and a release layer 36. The barrier layer 34 helps to obstruct UV light so as to reduce the effects of UV light exposure on the plastic film 20, and the release layer 36 helps to prevent the plastic film 20 from sticking to the adhesive strips 13 of the roofing shingles 11. The barrier and release layers 34, 36 are now described in greater detail.

In the depicted embodiment, the barrier layer 34 has two functions: to help neutralize the acidic components of the adhesive strip 13 of the roofing shingles 11, and to obstruct UV light. In FIGS. 2 and 3, the barrier layer 34 is disposed along the inner surface 22A of the plastic film 20, and thus overlaps the adhesive strips 13 and is contact therewith. It is believe that when sulphuric or other acidic compounds are released from the adhesive strips 13, the barrier layer 34 intercepts these compounds before they react with the plastic film 20, and thus helps to prevent the UV-resistance of the plastic film 20 from degrading. The barrier layer 34 therefore acts as an acid neutralizer. By neutralizing the effects of the adhesive strips 13, the barrier layer 34 helps to maintain the UV resistance of the plastic film 20, allowing it and the package 10 to be exposed to UV light for longer periods of time. The barrier layer 34 in the depicted embodiment is a coating that is a nitrocellulose base blended in with acid neutralizers. Other configurations for the barrier layer 34 are possible and within the scope of the present disclosure.

In FIGS. 2 and 3, the barrier layer 34 also forms a barrier to the passage of UV light. The barrier layer 34 therefore deflects or absorbs UV light to prevent it from affecting the plastic film 20. In the embodiment of FIGS. 2 and 3, the barrier layer 34 includes a black pigment 34A to obstruct UV light. The combination of the black pigment 34A with the white material of the rest of the plastic film 20 helps to inhibit the effects of UV light exposure on the plastic film 20. The white plastic film 20 helps to reflect some of the UV light. At least some of the UV light which is not reflected by the white plastic film 20 and which penetrates through the plastic film 20 at the location of the UV inhibitor strip portion 32 is absorbed by the black pigment 34A of the barrier layer 34. In the depicted embodiment, the black pigment 34A is carbon black. Carbon black is an effective absorber of UV light. The carbon black is mixed with a nitrocellulose base, and the mixture is then blended with the material of the barrier layer 34. One possible ratio of carbon black to the material of the barrier layer 34 is 1:1. The final content of the carbon black within the barrier layer 34 may be between about 12% and 15%, and may also be as high as about 20%. Other content percentages are possible. Indeed, other colours for the black pigment 34A are possible. In an embodiment, a dark colour is applied to the outer surface 22B of the plastic film 20 directly above the adhesive strips 13. In an embodiment where there is no black pigment 34A on the plastic film 20, the dark colour on the outer surface 22B helps to reduce the effect of the UV light on the plastic film 20.

Referring to FIGS. 2 and 3, the release layer 36 of the UV inhibitor strip portion 32 is applied overtop the barrier layer 34 on the inner surface 22A of the plastic film 20. The release layer 36 is therefore disposed between the adhesive strips 13 of the uppermost layer 11A of the roofing shingles 11 and the barrier layer 34. Depending on its composition, the barrier layer 34 may not have sufficient release properties to prevent the plastic film 20 from sticking to the adhesive strips 13. The release layer 36 therefore helps to provide the desired release properties. The release layer 36 may therefore be any suitable non-stick or releasable material or coating. In an embodiment, the release layer 36 is a UV silicone release. A non-limiting example of a suitable release layer 36 includes the SilForce™ UV9300 release coating used with or without a photoinitiator such as SilForce™ UV9380C.

The release layer 36 in the depicted embodiment occupies a relatively long and narrow segment of the plastic film 20. In the depicted embodiment, the release layer 36 occupies only a portion or area of the plastic film 20 that corresponds to the location of the adhesive strips 13 of the uppermost layer 11A of the roofing shingles 11. The release layer 36 is longer than it is wide. In the depicted embodiment, the release layer 36 faces and is aligned with the adhesive strips 13 of the uppermost layer 11A of the roofing shingles 11. The release layer 36 is disposed over the adhesive strips 13, and is in contact with the adhesive strips 13. In this location, the release layer 36 helps to prevent the plastic film 20 from sticking to the adhesive strips 13 of the roofing shingles 11 of the uppermost layer 11A.

In one possible application of the UV inhibitor strip portion 32, the coating weight for the barrier layer 34 is approximately 0.4 to 0.5 lb/ream. In a typical application, the barrier layer 34 is coated onto the inner surface 22A of the plastic film 20 before the release layer 36. The barrier layer 34 is cured, for example in a dryer at around 145° F. The release layer 36 is then applied overtop the cured barrier layer 34 on the inner surface 22A of the plastic film. A possible coating weight for a UV silicone release layer 36 is approximately 0.7 to 0.8 lb/ream. The total weight of the coated UV inhibitor strip portion 32 is approximately 1.1 to 1.3 lb/ream.

Therefore, in the embodiment of FIGS. 2 and 3, the UV inhibitor 30 is a coating of materials that provide a "double-hit" strip: a darkened pigment barrier coating and a UV-cured silicone release. This configuration of the UV inhibitor 30 helps to obstruct the penetration of UV light into the plastic film 20 while also facilitating a relatively easy removal or peeling of the plastic film 20 from the adhesive strips 13 of the uppermost layer 11A of the roofing shingles 11 when the package 10 is opened to access the roofing shingles 11.

Figure 4:
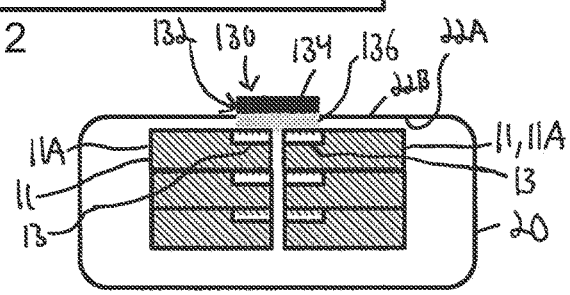
FIG. 4 is a cross-sectional view of an ultraviolet (UV)-resistant roofing shingles package according to another embodiment of the present disclosure.

Another embodiment of the UV inhibitor 130 is shown in FIG. 4. The UV inhibitor 130 includes the UV inhibitor strip portion 132 which is aligned with the adhesive strips 13 of the uppermost layer 11A of the roofing shingles 11. In the depicted embodiment, the barrier layer 134 is positioned on the outer surface 22B of the plastic film 20 over the adhesive strips 13 of the roofing shingles 11. In the depicted embodiment, the barrier layer 134 acts only to obstruct UV light, and does not serve to help neutralize the acidic components of the adhesive strip 13 of the roofing shingles 11. The release layer 136 is disposed on the inner surface 22A of the plastic film 20, and faces and is aligned with the adhesive strips 13 of the uppermost layer 11A of the roofing shingles 11. Therefore, in the embodiment of FIG. 4, the UV inhibitor 130 is a coating of materials that also provide a "double-hit" strip: a darkened pigment and a UV silicone release. This configuration of the UV inhibitor 130 helps to obstruct the penetration of UV light into the plastic film 20 while also facilitating a relatively easy removal or peeling of the plastic film 20 from the adhesive strips 13 of the uppermost layer 11A of the roofing shingles 11. In the depicted embodiment, the barrier layer 134 is a colour strip on the outer surface 22B having the same colour as the plastic film 20. The colour strip is applied directly over the adhesive strips 13 before artwork and printing is applied to the plastic film 20. The colour strip is colour matched to the plastic film 20 on the outer surface 22B. If a cross-section were taken of the plastic film 20 at the location of the barrier layer 134, the uppermost layer would be the colour strip of the barrier layer 134, the middle layer would be the plastic film 20, and the bottom layer would be the release layer 136.

Figure 5:
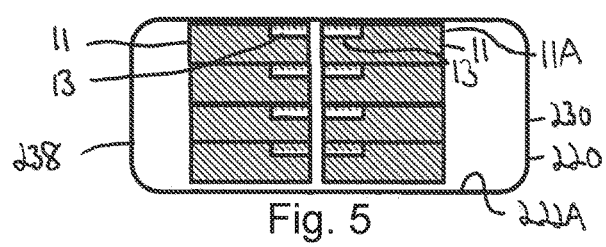
FIG. 5 is a cross-sectional view of an ultraviolet (UV)-resistant roofing shingles package according to yet another embodiment of the present disclosure.

Another embodiment of the UV inhibitor 230 is shown in FIG. 5. In the depicted embodiment, the UV resistance of the plastic film 220 is derived from its material composition. The plastic film 220 in FIG. 5 is free of a coating of UV-resistant material along a portion of the plastic film 220 which is aligned with the adhesive layers 13 of the roofing shingles 11 of the upper layer 11A. The UV inhibitor 230 includes a UV inhibitor film blend 238 that forms part of the plastic film 220. The UV inhibitor film blend 238 is integral with the plastic film 220. In the depicted embodiment, the UV inhibitor 230 is blended into the plastic film 220 itself.

The UV inhibitor film blend 238 includes a Hindered Amine Light Stabilizer (HALS) and a UV absorber. The HALS is any suitable chemical compound which contains an amine functional group that is used as a stabilizer in plastics and polymers. These compounds may be used to protect polymers from the effects of photo-oxidation. Non-limiting examples of a HALS that can be used include Chimassorb 944, Chimassorb 119, Tinuvin 622, Tinuvin 123, and combinations thereof. The UV absorber functions to absorb UV light. One possible example of the combination of the HALS and UV absorber making up the UV inhibitor film blend 238 is Chimassorb 944 and A531.

It has been observed that the HALS is often a basic compound, and thus tends to react with the acidic compound (e.g. sulphur) released from the adhesive strips 13 of the roofing shingles 11. This acid/base reaction depletes the HALS from the plastic film 220. In areas where the plastic film 220 is in contact with the adhesive strips 13, the depletion of the HALS leaves the area exposed to UV light which can lead to premature degradation of the plastic film 220. In order to help reduce the depletion of the HALS from the plastic film 220, the HALS is selected so that it is less reactive to the acidic compounds released from the adhesive strip 13. The decreased reactivity may result from one or more of the following properties of the HALS: its pKa value, and its molecular structure. For example, the HALS may have a pKa value similar to a pKa value of the adhesive strips 13 of the roofing shingles 11. The pKa is a measure of basicity, where a lower pKa value corresponds to a weaker base and a higher pKa value corresponds to a stronger base. By making the pKa of the HALS similar to that of the adhesive strips 13, the HALS may be made less reactive with the adhesive strips 13. Examples of pKa values for the HALS include about 9.5 for Chimassorb 944, about 9 for Chimassorb 119, about 6.3 for Tinuvin 622, and about 4 for Tinuvin 123. Other pKa values are possible. The less reactive HALS is thus less likely to be depleted from the plastic film 220.

Still referring to FIG. 5, the UV inhibitor 230 may also include a weathering grade white plastic. This "weathering white" plastic may be blended into the plastic film 220, either with or without the UV inhibitor film blend 238. The weathering grade white plastic may endure longer exposures to UV light compared to regular or non-weathering grade white plastic. For some weathering grade white plastics, their additional UV resilience is derived from a coating of titanium oxide ($TiO_2$), which makes the white plastic more light-stabilized. All of the plastic film 220 may be made of the weathering grade white plastic, or only a portion thereof (e.g. corresponding to the overlap of the adhesive strips 13) may be made from the weathering grade white plastic.

One possible combination of the weathering grade white plastic and the UV inhibitor film blend 238 to form the UV inhibitor 230 is the following. The UV inhibitor film blend 238 is blended in with the weathering grade white plastic. The two are added in at 6% loading, resulting in 3.3% $TiO_2$ (i.e. weathering grade white plastic) and 6500 ppm of the UV inhibitor film blend 238. Another possible loading at 7.5% results in 4.2% $TiO_2$ and 6500 ppm of the UV inhibitor film blend 238. In the embodiment of FIG. 5, where the UV inhibitor 230 is present within the plastic film 220 itself, the plastic film 220 has a release strip on the inner surface 222A to help prevent the plastic film 220 from sticking to the adhesive strips 13 of the roofing shingles 11. Therefore, in the embodiment of FIG. 5, the UV inhibitor 230 is a blend of materials that make up the plastic film 220 itself.

In other embodiments, the UV-resistance of the package 10 is derived from physical or mechanical features, rather than chemical agents. In one possible embodiment, the UV inhibitor strip portion 32,132 has a strip thickness that is greater than a thickness of the plastic film 20. In such an embodiment, the thicker UV inhibitor strip portion 32,132 provides more plastic material to resist degradation by the acidic compounds of the adhesive strip 13, and is thus better able to endure prolonged exposures to UV light. In one possible configuration, the UV inhibitor strip portion 32,132 has a thickness of about 3 mil (i.e. 3 thousandths of an inch), and the thickness of the remainder of the plastic film 20 is 1.75 mil. It will be appreciated that the entire plastic film 20, instead of only the UV inhibitor strip portion 32,132, may have an increased thickness.

Figure 6:
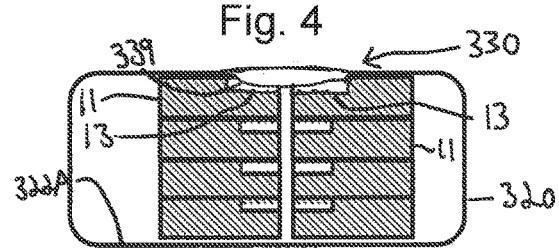
FIG. 6 is a cross-sectional view of an ultraviolet (UV)-resistant roofing shingles package according to yet another embodiment of the present disclosure.

Another possible mechanical feature is shown in FIG. 6. In the depicted embodiment, the UV inhibitor 330 includes a protective film strip 339 disposed on the inner surface 322A of the plastic film 320. The protective film strip 339 is positioned underneath the plastic film 320 and is in contact with the adhesive strips 13 of the roofing shingles 11. The protective film strip 339 therefore forms a physical barrier which helps to shield the overlying plastic film 320 from exposure to acidic compounds released from the adhesive strip 13. The protective film strip 339 may be a separate piece of material applied to the inner surface 322A of the outer film 320, or may be an extra strip of the plastic film 320 itself. Therefore, in the embodiment of FIG. 6, the UV inhibitor 330 is an extra piece of material that forms a physical barrier to shield the portion of the plastic film 320 from acidic compounds released from adhesive strip 13.

Figure 7:
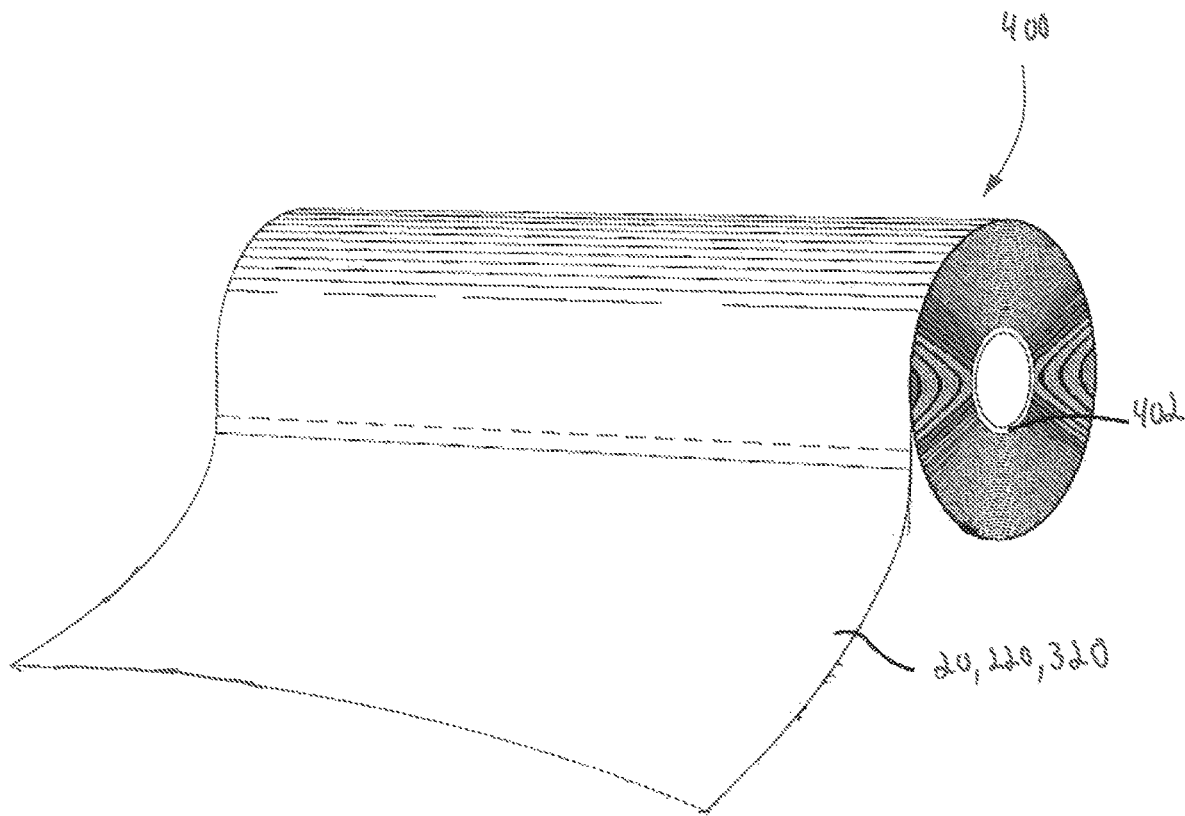
FIG. 7 a perspective view of an ultraviolet (UV)-resistant roofing shingles packaging roll, according to yet another embodiment of the present disclosure.

Referring to FIG. 7, the UV-resistant roofing shingles plastic film 20,220,320 may be provided in a packaging roll 400, where the roofing shingles plastic film 20,220,320 is wound about a core 402 of the roll 400. In such a configuration, the roll 400 may be referred to as a "roll stock", and is mountable about a spindle or other suitable rotatable support. The roll forms an endless web of the plastic film 20,220,320 and is used to form the package 10 disclosed herein. Although the plastic film 20,220,320 is shown in FIG. 7 as having perforations or tear lines formed therein, it will be appreciated that the plastic film 20,220,320 may be integral or free of perforations or tear lines.

Referring to FIG. 1, there is also disclosed a method of packaging the roofing shingles 11. The method includes providing the plastic film 20,220,320 with the UV inhibitor 30,130,230,330 to obstruct UV light. The method includes wrapping the plastic film 20,220,320 about the roofing shingles 11.

Referring to FIG. 1, there is also disclosed a method of forming the plastic film 20,220,320. The method includes providing a plastic film, and providing the UV inhibitor 30,130,230,330 to obstruct UV light.

The above description is meant to be exemplary only, and one skilled in the art will recognize that changes may be made to the embodiments described without departing from the scope of the invention disclosed. For example, although the different embodiments of the UV inhibitors 30,130,230, 330 may be described herein separately, it will be appreciated that one or more of the UV inhibitors 30,130,230,330 can be combined in a single package 10 to improve its UV resistance. Still other modifications which fall within the scope of the present invention will be apparent to those skilled in the art, in light of a review of this disclosure, and such modifications are intended to fall within the appended claims.

The invention claimed is:

1. An ultraviolet (UV)-resistant roofing shingles plastic film, comprising: an inner surface to face roofing shingles, an outer surface and two pairs of edges, the edges of each of the two pairs of edges being parallel to one another, the edges of one of the two pairs of edges being perpendicular to the edges of the other of the two pairs of edges, the edges being interconnected and defining a rectangular body of the plastic film, the plastic film having a UV inhibitor to obstruct UV light, the UV inhibitor including a UV inhibitor film blend forming part of the plastic film, the UV inhibitor film blend including a Hindered Amine Light Stabilizer (HALS) and a UV absorber, wherein the UV absorber of the UV inhibitor film blend is free of carbon black the UV inhibitor including a UV inhibitor strip portion extending along a length of the plastic film and being parallel to the edges of one of the two pairs of edges, the UV inhibitor strip portion disposed on the rectangular body inwardly of the edges of said one of the two pairs of edges to be aligned with adhesive strips of the roofing shingles, the UV inhibitor strip portion having a barrier layer coating, the UV inhibitor strip portion having a release layer coating on the inner surface to face the adhesive strips of the roofing shingles.

2. The UV-resistant roofing shingles plastic film as defined in claim 1, wherein the barrier layer coating is on the inner surface of the plastic film to face the adhesive strips of the roofing shingles, and the release layer coating is disposed over the barrier layer coating to be positioned between the barrier layer coating and the adhesive strips of the roofing shingles.

3. The UV-resistant roofing shingles plastic film as defined in claim 1, wherein the HALS has a pKa value selected to reduce reactivity with the adhesive strips of the roofing shingles.

4. The UV-resistant roofing shingles plastic film as defined in claim 1, wherein the UV inhibitor film blend includes a weathering grade white plastic.

5. The UV-resistant roofing shingles plastic film as defined in claim 1, wherein the UV inhibitor strip portion has a strip thickness being greater than a thickness of the plastic film.

6. The UV-resistant roofing shingles plastic film as defined in claim 1, wherein the UV inhibitor includes a protective film strip disposed on the inner surface of the plastic film.

7. The UV-resistant roofing shingles plastic film as defined in claim 1, wherein the UV absorber of the UV inhibitor film blend is A531.

8. The UV-resistant roofing shingles plastic film as defined in claim 1, wherein the HALS has a pKa value similar to a pKa value of the adhesive strips of the roofing shingles.

9. The UV-resistant roofing shingles plastic film as defined in claim 1, wherein the release layer coating is a UV silicone release.

10. The UV-resistant roofing shingles plastic film as defined in claim 1, wherein the barrier layer coating of the UV inhibitor strip portion includes a black pigment to obstruct UV light.

11. The UV-resistant roofing shingles plastic film as defined in claim 1, wherein the barrier layer coating of the UV inhibitor strip portion is free of a black pigment.

12. The UV-resistant roofing shingles plastic film as defined in claim 1, wherein the UV inhibitor strip portion is rectangular and includes a first pair of parallel edges extending along the length of the plastic film parallel to said one of the two pairs of edges, and a second pair of parallel edges extending parallel to the edges of the other of the two pairs of edges.

* * * * *